United States Patent

Shinohara et al.

Patent Number: 5,726,839
Date of Patent: Mar. 10, 1998

[54] MAGNETIC HEAD HAVING BYPASS MAGNETIC PATH AND SET MAGNETIC RELUCTANCE RELATIONSHIP

[75] Inventors: Masayoshi Shinohara; Minoru Takahashi; Hiroaki Wakamatsu, all of Kawasaki, Japan

[73] Assignee: Fujitsu Limited, Kawasaki, Japan

[21] Appl. No.: 649,336

[22] Filed: May 17, 1996

Related U.S. Application Data

[63] Continuation of Ser. No. 299,115, Sep. 2, 1994, abandoned.

[30] Foreign Application Priority Data

Dec. 8, 1993 [JP] Japan .................................. 5-306935

[51] Int. Cl.$^6$ ................................................ G11B 5/39
[52] U.S. Cl. ................................................ 360/113
[58] Field of Search ................................ 360/113, 126, 360/125

[56] References Cited

U.S. PATENT DOCUMENTS

| | | | |
|---|---|---|---|
| 4,051,542 | 9/1977 | Kanai | 360/113 |
| 4,164,770 | 8/1979 | Jeffers | 360/113 |
| 4,626,946 | 12/1986 | Vinal | 360/113 |
| 4,734,644 | 3/1988 | Imakoshi et al. | 360/113 |
| 4,789,910 | 12/1988 | Otsuka et al. | 360/113 |
| 4,847,558 | 7/1989 | Fisher et al. | 369/58 |
| 5,097,372 | 3/1992 | Fukazawa et al. | 360/113 |
| 5,155,642 | 10/1992 | Voegeli | 360/113 |
| 5,155,644 | 10/1992 | Kira et al. | 360/113 |
| 5,193,039 | 3/1993 | Smith et al. | 360/113 |
| 5,255,141 | 10/1993 | Valstyn et al. | 360/113 |

FOREIGN PATENT DOCUMENTS

| | | | |
|---|---|---|---|
| 0482642 | 4/1992 | European Pat. Off. | 360/113 |
| 58-114321 | 7/1983 | Japan | 360/113 |
| 60-59516 | 4/1985 | Japan . | |
| 60-115014 | 6/1985 | Japan . | |
| 60-177409 | 9/1985 | Japan | 360/113 |
| 61-131212 | 6/1986 | Japan | 360/113 |
| 3-037815 | 2/1991 | Japan | 360/113 |
| 4-364212 | 12/1992 | Japan | 360/113 |

Primary Examiner—Craig A. Renner
Attorney, Agent, or Firm—Nikaido, Marmelstein, Murray & Oram LLP

[57] ABSTRACT

A magnetic head for vertical magnetic recording includes a return portion having a sufficiently large area confronting a magnetic recording medium, a main pole having its front end portion confronting the magnetic recording medium, a magneto-resistive film provided in the middle of a magnetic circuit, including the return portion, the main pole, and the magnetic recording medium. The magnetic head has its initial magnetization set in the direction virtually orthogonal to the direction of flux in the magnetic circuit. A first and a second terminal are connected to both ends of the magneto-resistive film. The magnetic circuit also includes a bypass magnetic path magnetically connecting the main pole with the return portion.

17 Claims, 10 Drawing Sheets

MAGNETIC HEAD HAVING BYPASS MAGNETIC PATH AND SET MAGNETIC RELUCTANCE RELATIONSHIP

This application is a continuation of application Ser. No. 08/299,115 filed Sep. 2, 1994, now abandoned.

BACKGROUND OF THE INVENTION

1. Field of the Invention

The present invention relates to a magnetic head for use in vertical magnetic recording using a magnetic recording medium such as a magnetic disk.

2. Description of the Related Art

In the field of magnetic recording using a magnetic recording medium such as a magnetic disk, vertical magnetic recording is considered more advantageous from the technical viewpoint than horizontal magnetic recording, and optimal structure of the magnetic head for vertical magnetic recording improved in its processability and output characteristics is being searched for.

As a magnetic head for vertical magnetic recording, that which includes a return portion having an end face with a sufficiently large area and confronting a magnetic recording medium and a main pole whose front end portion confronts the magnetic recording medium is known. The recording of information is achieved by arranging the front end of the main pole to confront the surface of a magnetic recording medium which has an anisotropic vertical magnetic property and passing a current through a coil arranged for example to surround the main pole. Thereby, the main pole is magnetized and the magnetic recording medium is magnetized. It is known that the recording efficiency is improved in this instance by providing a lining layer made of a soft magnetic material disposed under the recording layer of the medium.

In reading out information, flux from the medium passing through the main pole is utilized. Namely, it is general practice to change the flux by causing the main pole and the medium to make relative movement and pick up the current then generated in the coil as changes in voltage. When it is attempted to increase the recording density, the volume of the medium for each bit is decreased and as the result the quantity of the flux from the medium decreases. Hence, the read out output is decreased and the reading becomes difficult.

Recently, it has been started to use a magneto-resistive head (MR head) for reading, which makes use of the magneto-resistive effect, i.e., the effect of the electrical resistance of a material varying with the magnitude of the magnetic field applied. The MR head detects the change in the electrical resistance of a magneto-resistive element depending on the magnitude of the flux from a magnetic recording medium by means of a sense current passed through the element. It, in its technical principle, has a merit that the output becomes larger according as the sense current is increased.

Since the sense current is required in the MR head, when a conductive recording medium such as a metal disk is used, the sense current leaks out when the MR head comes into contact with the surface of the magnetic recording medium. Further, even when the MR head is prevented from contacting the conductive recording medium, a potential difference may be produced between the MR head and the recording medium and there is a danger of a discharge occurring therebetween.

In order to solve such problems, it is an effective way to use a flux guide magnetically connected with the magneto-resistive element so that the flux from the recording medium is introduced into the magneto-resistive element through the flux guide.

When such a flux guide is used, it is preferred that good linearity is held between the magnetic behavior of the flux guide and the magnetic behavior of the magneto-resistive element. Sometimes, it becomes difficult to secure the linearity in sensitivity in sensing because, even when one of the flux guide and the magneto-resistive element has been magnetically saturated by the flux from the recording medium, the other is then not necessarily magnetically saturated.

The MR head, in principle, is a head which is exclusively for reading and, hence, a recording head is required if it should record. In an MRhead in practice for horizontal record disk, an MR head is laminated on the so-called ring-type thin film coil head and, hence, they are integrated in appearance. However, the integration by lamination of the reading portion using a magneto-resistive element and the recording portion using a coil makes the manufacturing process of the head very complicated.

SUMMARY OF THE INVENTION

Accordingly, an object of the invention is to provide a vertical magnetic recording head in which linearity in sensitivity in sensing is easily secured.

Another object of the invention is to provide a vertical magnetic recording head simple in structure in spite of its laminated structure of the recording portion and reading portion.

According to an aspect of the invention, there is provided a magnetic head for vertical magnetic recording, which comprises a return portion having a sufficiently large area confronting a magnetic recording medium, a main pole having its front end portion confronting the magnetic recording medium, a magneto-resistive film provided in the middle of a magnetic circuit including the return portion, the main pole, and the magnetic recording medium and having its initial magnetization set in the direction virtually orthogonal to the direction of flux in the magnetic circuit, and a first and a second terminal connected to both ends of the magneto-resistive film, and in which the magnetic circuit further includes a bypass magnetic path magnetically connecting the main pole with the return portion.

According to another aspect of the invention, there is provided a magnetic head for vertical magnetic recording, which comprises a return portion having a sufficiently large area confronting a magnetic recording medium, a main pole having its front end portion confronting the magnetic recording medium, a magneto-resistive film provided in the middle of a magnetic circuit including the return portion, the main pole, and the magnetic recording medium and having its initial magnetization set in the direction virtually orthogonal to the direction of flux in the magnetic circuit, and a first and a second terminal connected to both ends of the magneto-resistive film, and in which the relationship given by the expression $$Rb/Rmr = 0.3 \cdot Smr/Sg$$

is satisfied, where Rb is the magnetic reluctance corresponding to leakage flux between the main pole and the return portion, Rmr is the magnetic reluctance of the magneto-resistive film in the magnetic circuit, Smr is the sectional area of the magneto-resistive film, and Sg is the sectional area of the front end portion of the main pole.

Since a bypass magnetic path is provided in the first aspect of the invention and parameters related to magnetic reluctance and sectional areas are set to satisfy a specific condition in the second aspect of the invention, it is easy to secure linearity in sensitivity in sensing.

In either of the aspects of the invention, by providing an additional excitation means for exciting the magnetic circuit in accordance with a record writing signal thereby producing vertical magnetization in the magnetic recording medium, a writing function can be performed.

The excitation means for example includes a coil interlinked with the bypass magnetic path in the first aspect of the invention, or a coil interlinked with the main pole in the second aspect of the invention. It is easy to incorporate such a coil with the magnetic head, and therefore, a magnetic head for vertical magnetic recording simple in structure in spite of the laminated structure of the recording portion and the reading portion can be provided by the invention.

The above and other objects, features and advantages of the present invention and the manner of realizing them will become more apparent, and the invention itself will best be understood from a study of the following description and appended claims with reference to the attached drawings which show some preferred embodiments of the invention.

DESCRIPTION OF THE PREFERRED EMBODIMENTS

Figure 1:
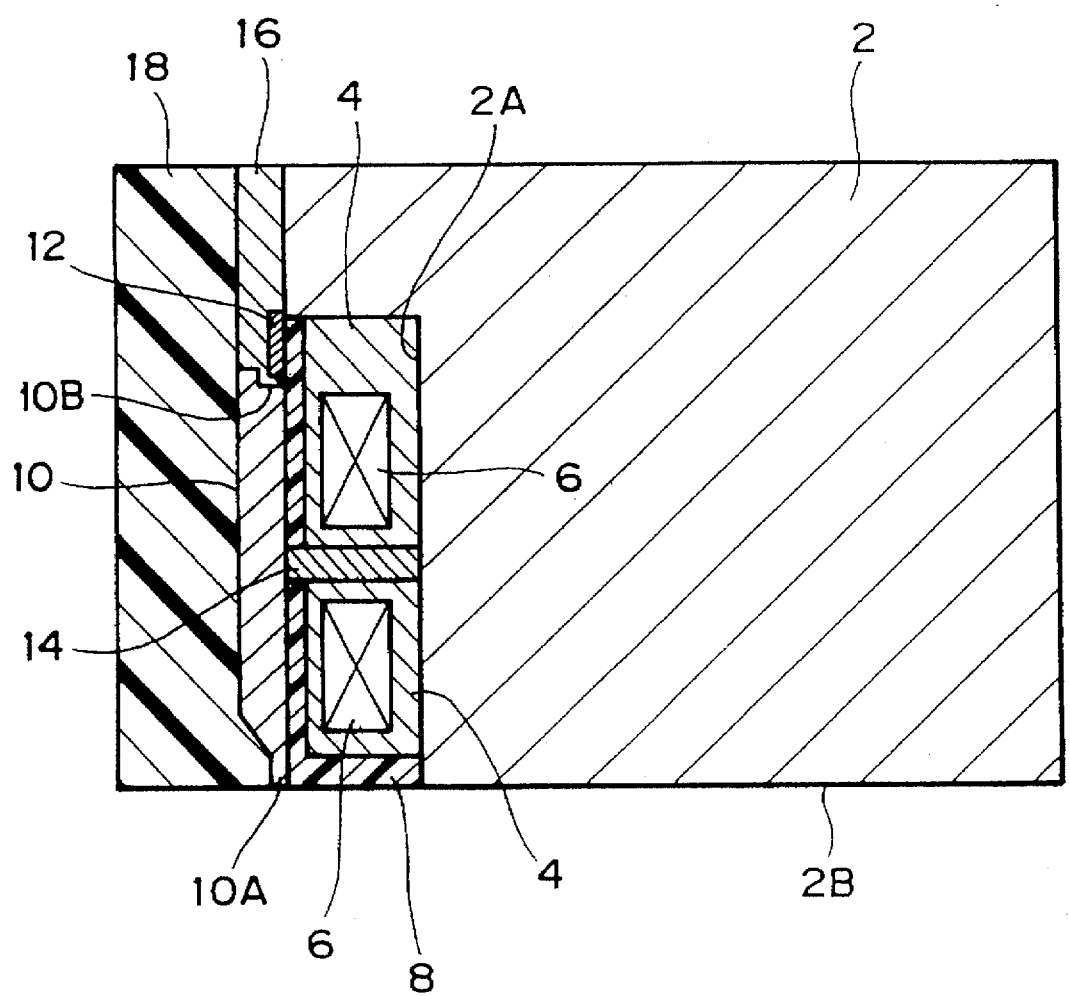
FIG. 1 is a diagram showing a basic structure of a magnetic head for vertical magnetic recording of the invention.

FIG. 1 is a sectional view showing a basic structure of a magnetic head for vertical magnetic recording according to one embodiment of the invention. In a main pole forming area of a return portion 2 made of a magnetic material such as ferrite, there is provided a recess 2A by grinding work or the like. The return portion 2 has an end face 2B with a sufficiently large area confronting a magnetic recording medium, not shown. Within the recess 2A of the return portion 2, there is provided a laminated coil 6 spirally formed by film formation of copper or the like with a nonmagnetic insulating layer 4 interposed therebetween.

The nonmagnetic insulating layer 4 is covered with a high-hardness, wear-resistant insulating layer 8 made of amorphous carbon or the like, and on the wear-resistant insulating layer 8, there is formed a main pole 10 for example made of permalloy similarly to the magnetoresistive film (MR film) 12 which is made of permalloy. Permalloy is a Ni/Fe alloy of composition about $80/20$.

The main pole 10 has a front end portion 10A confronting the magnetic recording medium. The MR film 12 is arranged between the end portion 10B opposite to the front end portion 10A of the main pole 10 and the return portion 2 in a state insulated from the main pole 10. The portion in the middle of the main pole 10 and the return portion 2 are magnetically connected by a bypass magnetic path 14 passing through the nonmagnetic insulating layer 4. The MR film 12 is surrounded by a nonmagnetic insulating layer 16 and, on the nonmagnetic insulating layer 16 and the main pole 10, there is further formed a wear-resistant insulating layer 18. Thus, the magnetic head is formed so as to have a contact sliding surface over the magnetic recording medium made up of the wear-resistant insulating layers 8 and 18, with the front end portion 10A of the main pole 10 exposed in the surface.

In reading out information recorded in a magnetic recording medium, the main pole 10 functions as the so-called flux guide and there is formed a magnetic circuit including the main pole 10, the magnetic recording medium, the return portion 2, and the MR film 12. Therefore, bypassing a sense current through the MR film 12 in the direction perpendicular to the surface of the paper, changes in the magnetic flux from the magnetic recording medium can be detected as changes in voltage between both ends of the MR film 12. In writing into the magnetic recording medium, a magnetic circuit including the main pole 10, the magnetic recording medium, the return portion 2, and the bypass magnetic path 14 is magnetized by the coil 6, and thereby vertical magnetization can be produced in the magnetic recording medium.

When a flux guide (the main pole 10 in the structure shown in FIG. 1) is used in reading information written in a magnetic recording medium by means of an MR film 12, it is desired that the magnetic behavior of the flux guide and the behavior of the MR film have good linearity. When either the flux guide or the MR film becomes magnetically saturated or nearly saturated, the linearity is deteriorated.

Generally speaking, the MR film has larger electrical resistance the thinner it is. Accordingly, in order to increase the change in the resistance of the MR film with respect to a unit change in the magnetic flux from the magnetic recording medium, it is preferred that the MR film is made sufficiently thinner than the flux guide. For example, the thickness of the MR film is 0.03 µm while the thickness of the front end of the flux guide is 0.3 µm. In this case, the MR film is more likely to be magnetically saturated and it becomes difficult to secure good linearity in sensitivity in sensing.

Therefore, in the present invention, the magnetic reluctance of the bypass magnetic path is adjusted so that the MR film may not be saturated until the flux guide is saturated. The conditions under which the linearity in the sensitivity in sensing is secured will be considered in the following.

Figures 2A, 2B:
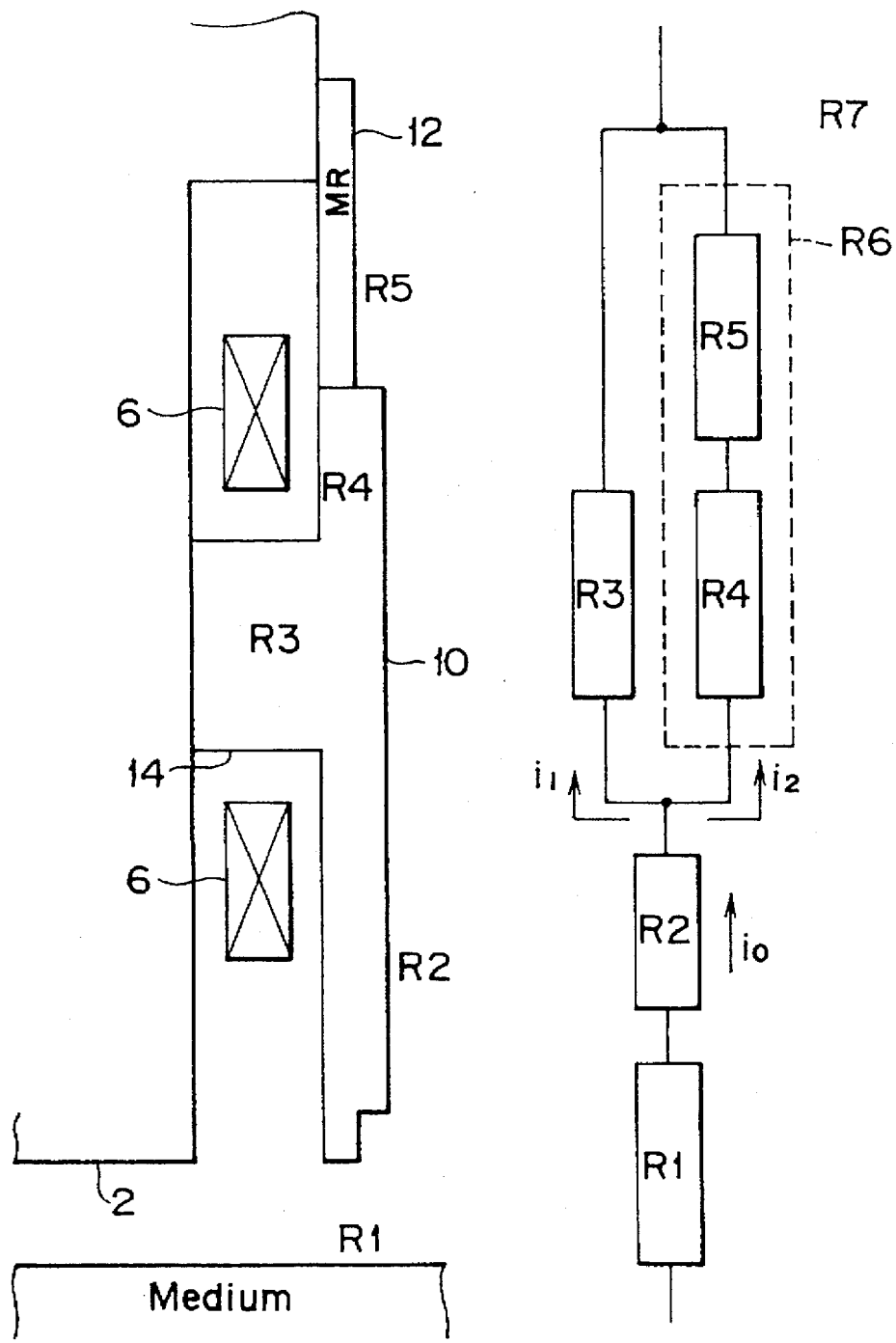
FIG. 2A is a diagram showing the main portion of the magnetic head of FIG. 1.
FIG. 2B is a diagram showing an equivalent magnetic circuit to the magnetic head of FIG. 1.

FIG. 2A is a diagram showing the main portion of the magnetic head shown in FIG. 1 and FIG. 2B is a diagram showing an equivalent magnetic circuit to the main portion. Reference character R1 denotes reluctance of the space between the magnetic recording medium and the front end portion of the main pole 10, R2 denotes reluctance of the portion of the main pole 10 below the bypass magnetic path 14, R3 (Rb) denotes reluctance of the bypass magnetic path 14, R4 denotes reluctance of the portion of the main pole 10 above the bypass magnetic path 14, and R5 (Rmr) denotes reluctance of the MR film 12. Further, reference character i0 denotes magnetic flux passing through the front end portion of the main pole 10, i1 denotes magnetic flux passing through the bypass magnetic path 14, and i2 denotes magnetic flux passing through the MR film 12. Then, the following relational expressions hold:

$R6=R4+R5$ $1/R7=1/R3+1/R6=(R6+R3)/R3 \cdot R6$ $R7=R3 \cdot R6/(R3+R6)$ $Rt=R1+R2+R7$ $i_0=i_1+i_2$ $i_1 \cdot R3=i_2 \cdot R6$ $i_2/i_1=R3/R6$ $i_0=i_1+i_1(R3/R6)=i_1(1+R3/R6)$ $i_1/i_0=1/(1+R3/R6)$ $i_2/i_0=1/(1+R6/R3)$ From the above, it is known that the ratio between the magnetic flux $i_2$ passing through the MR film 12 and the magnetic flux $i_0$ passing through the front end portion of the main pole 10 is given by $i_2/i_0=1/(1+R6/Rb)$ If the case in which $R6=Rmr+R4 \approx Rmr$ ($R4 \ll Rmr$) is considered, we obtain $i_2/i_0 \approx 1/(1+Rmr/Rb)$  (1)

It is common practice here to apply a sense bias in a direction of 45 degrees to the MR film 12 to linearize the relationship between the change in resistance and the change in magnetization of the MR film 12 (optimum bias). In order to apply the bias to the MR film 12, a film of soft magnetic material, to be described later, is previously laminated on the MR film 12. Then, the soft magnetic film is magnetized by the current passed through the MR film 12, and the bias to be applied to the MR film 12 is produced by the magnetic field due to the magnetization. Since the magnetization of the soft magnetic material at this time is virtually in saturation, the magnetic flux coming from the magnetic recording medium in the reading hardly passes through the soft magnetic film.

Now, when the saturation magnetic flux density at the front end portion of the main pole 10 and the saturation magnetic flux density of the MR film 12 are set to be the same, and a sense bias is applied so that the magnetization of the MR film 12 is inclined at 45 degrees, the extent to which the magnetization of the MR film 12 can be varied is the point where the magnetization inclined by 45 degrees is saturated. The range is given by $(1-1/\sqrt{2})=0.3$, namely, the magnetization can be varied by about 30% of the saturation value. Supposing that the front end portion of the main pole 10, when the MR film 12 is magnetized to the maximum magnetization, is also saturated and representing the sectional area and the saturation magnetic flux density of the MR film 12 by Smr and Bsmr, respectively, and the sectional area of the front end portion of the main pole 10 and the saturation magnetic flux density by Sg and Bsg, respectively, we obtain, by substituting $0.3 \cdot Smr \cdot Bsmr/Sg \cdot Bsg$ for i2/i0 in equation (1), $0.3 \cdot Smr \cdot Bsmr/Sg \cdot Bsg = 1/(1+Rmr/Rb)$.

When $1 \ll Rmr/Rb$, $Rb/Rmr = 0.3 \cdot Smr \cdot Bsmr/Sg \cdot Bsg$  (2)

If the MR film 12 and the front end portion of the main pole 10 are made of the same material, i.e., Bsmr=Bsg, equation (2) can be rewritten into $Rb/Rmr = 0.3 \cdot Smr/Sg$  (3)

Thus, by satisfying equation (2) or (3), the MR film 12, when the front end portion of the main pole 10 is saturated, will also be saturated, by the magnetic flux from the magnetic recording medium and the linearity in sensitivity in sensing can be secured.

Examples of dimensions and other parameter of each part will be given below. The thickness of the MR film 12 (the length from left to right in FIG. 2A, the same rule applies hereinafter), the width of the same (the length in the direction perpendicular to the paper surface of FIG. 2A, the same rule applies hereinafter), the height of the same (the length from top to bottom in FIG. 2A, the same rule applies hereinafter), and the permeability of the same are 0.02 µm, 10 µm, 3 µm, and 500, respectively, and when the soft magnetic layer is present, the thickness, width, height, and permeability of the same are 0.05 µm, 10 µm, 3 µm, and 500, respectively. The thickness, width, height, and permeability of the bypass magnetic path 14 are 30 µm, 10 µm, 5 µm, and 300, respectively, the thickness, width, height, and permeability of the portion of the main pole 10 above the bypass magnetic path 14 are 3 µm, 10 µm, 10 µm, and 1000, respectively, the thickness, width, height, and permeability of the portion of the main pole 10 below the bypass magnetic path 14 are 3 µm, 10 µm, 30 µm, and 1000, respectively, and the thickness, width, height, and permeability of the front end portion of the main pole 10 are 0.3 µm, 3 µm, 5 µm, and 1000, respectively.

In this instance, the sectional area of the front end portion of the main pole 10 becomes $Sg=0.3 \cdot 3=0.9$ µm² and the sectional area of the MR film 12 becomes $Smr=0.02 \cdot 10=0.2$ µm². At this time, how much of the magnetic flux at the front end portion of the main pole 10 flows into the MR film 12 is calculated to be 6.7%. Accordingly, when 23% of the saturation magnetic flux of the front end portion of the main pole 10 flows into the MR film 12, we obtain $0.9 \cdot 0.067/0.2 = 0.30$.

From this, it is known that about 30% of the saturation magnetic flux flows into the MR film 12.

Figure 3:
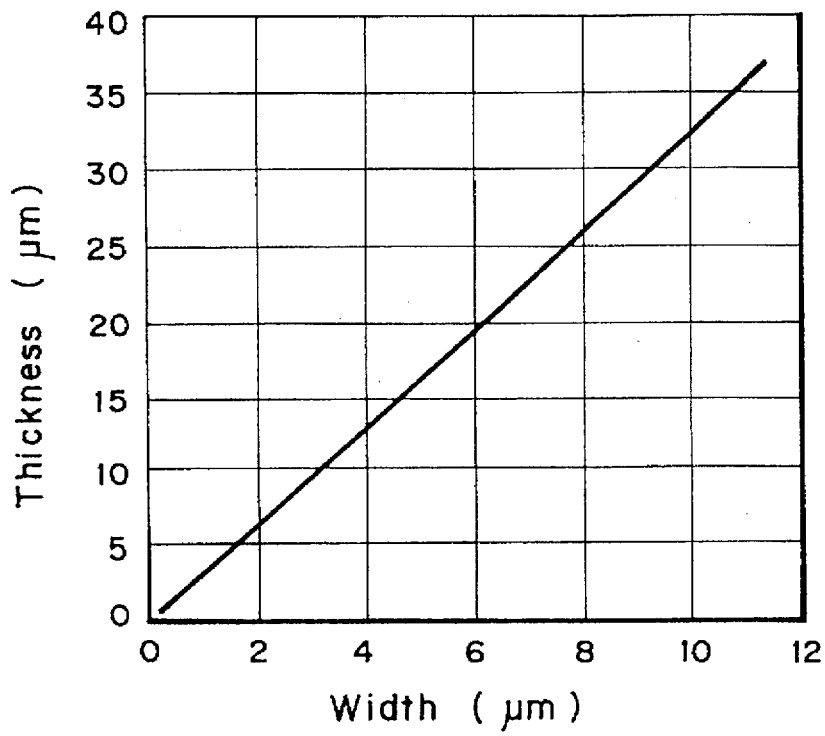
FIG. 3 is a graph showing relationship between thickness and width of a bypass magnetic path providing optimal conditions.

Since the MR film 12 is in a state magnetized to 70% by the bias, the total magnetization becomes 100% and thus the MR film is saturated. Namely, the MR film 12 is saturated at the same time as the front end portion of the main pole 10 is saturated and very high efficiency is obtained. Such optimal conditions can be attained also by changing the width and thickness of the bypass magnetic path. The conditions are shown in FIG. 3. In FIG. 3, the axis of ordinates represents the thickness of the bypass magnetic path 14 and the axis of abscissas represents the width of the bypass magnetic path 14.

Figure 4:
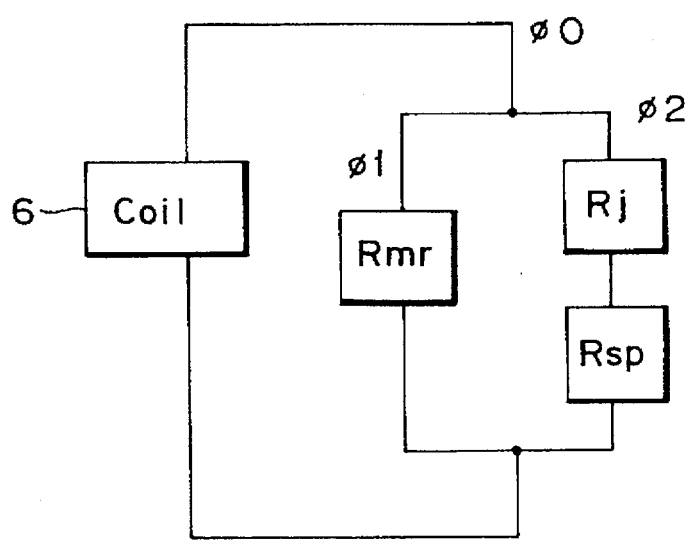
FIG. 4 is a diagram showing an equivalent magnetic circuit to the magnetic head in the writing.

Recording efficiency in the writing of data will be described below. FIG. 4 is a diagram showing an equivalent magnetic circuit to that in the writing. The diagram indicates a state of the total magnetic flux $\phi 0$ produced by the magnetomotive force from the coil 6 interlinked with the bypass magnetic path being divided into magnetic flux $\phi 1$ passing through the MR film 12 and magnetic flux $\phi 2$ passing through the front end portion of the main pole 10. Reference character Rmr denotes the magnetic reluctance of the MR film 12, Rj denotes the magnetic reluctance of the main pole 10 from its front end portion to the bypass magnetic path 14, and Rsp denotes the magnetic reluctance of the space between the front end portion of the main pole 10 and the magnetic recording medium. When values of these are calculated using the above mentioned particular numerical values, we obtain Rmr=300 and Rj=55 and, further, obtain Rsp=1111 when the spacing is 0.1 μm or Rsp=333 when the spacing is 0.03 μm. Since, here, the relationships $$\phi 0 = \phi 1 + \phi 2, \text{ and}$$

$$\phi 1 \cdot Rmr = \phi 2(Rj + Rsp)$$

hold, we obtain $\phi 2/\phi 0=0.20$ when the spacing is 0.1 μm and $\phi 2/\phi 0=0.43$ when the spacing is 0.3 μm.

Namely, when the spacing is 0.1 μm (floating height 0.07 μm+protecting film 0.03 μm), about 20% of the magnetic flux produced by the coil flows through the front end portion of the main pole, while when the spacing is 0.03 μm, i.e., in the so-called contact recording, about 43% of the magnetic flux produced by the coil flows through the front end portion of the main pole. Accordingly, in terms of recording efficiency when implementing the invention, it is preferred that the magnetic head is used as the contact head.

Figure 5:
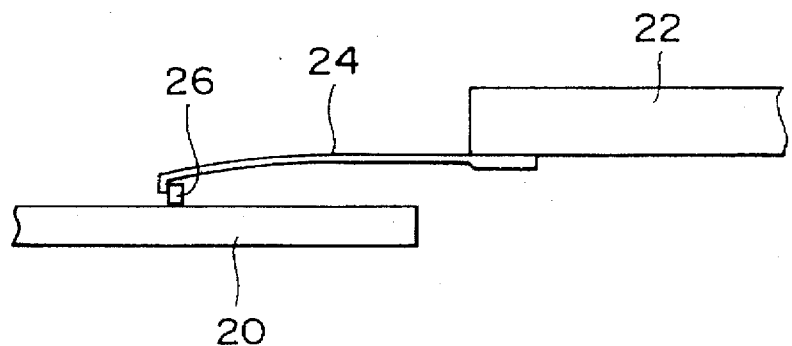
FIG. 5 is a diagram showing an example of a contact head.

FIG. 5 is a diagram showing a contact head. In this example, a means in which the front end portion 10A of the main pole 10 and the end face 2B of the return portion 2 are held substantially in contact with the magnetic recording medium 20 is used. In concrete terms, a magnetic head 26 is attached to the front end of a supporting spring 24 fixed to a supporting arm 22 and the magnetic head 26 is held in contact with the magnetic recording medium 20 by a predetermined contact pressure provided by the mass of the magnetic head 26 and the spring force of the supporting spring 24.

In such a contact head, it is preferred that the magnetic head 26 is as small and light as possible to reduce the wear of the magnetic head 26 and the magnetic recording medium 20. In the embodiment, since the coil 6 is interlinked with the bypass magnetic path 14 and the main pole 10 is used so as to also serve as a flux guide for the MR film 12, the magnetic head can be easily simplified in structure and its miniaturization and weight lightening can be achieved. In this example, the load force of the magnetic head 26 is 100 mg, and the height, width, and thickness of the magnetic head 26 are 500 μm, 500 μm, and 200 μm, respectively.

The coil 6 interlinked with the bypass magnetic path 14 in FIG. 1 can be used not only for writing but also for reading. In the reading, the output level can be raised by combining the read signal from the coil 6 and the read signal from the MR film 12. However, since the electromotive force produced in the coil 6 is in proportion to the rate of change in the magnetic flux while the MR film 12 detects the absolute value of the magnetic flux, it is better to use the following method in combining the signals.

Figure 6:
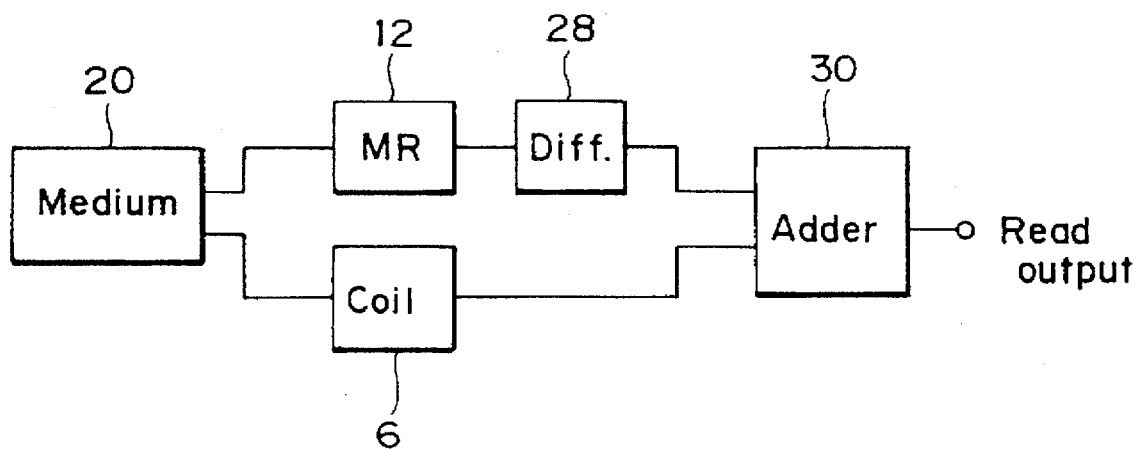
FIG. 6 is a block diagram showing an example of a read circuit.

FIG. 6 is a block diagram showing an example of a reading circuit used in the method in which both the coil and the MR film 12 are used for reading. The read signal from the MR film 12 depending on the flux from the magnetic recording medium 20 is differentiated by a differentiation circuit 28 and the differential signal is supplied to a signal combining adder 30. Meanwhile, a read signal from the coil 6 depending on the flux from the magnetic recording medium 20 is directly supplied to the signal combining adder 30. These read signals are combined in the signal combining adder 30 and the combined signal is output therefrom. Since the signal waveforms to be combined are matched with each other in the signal combining adder 30, the read output by the magnetic head can be enhanced.

In the above described embodiment, the coil 6 is arranged interlinked with the bypass magnetic path 14, but a magnetic head for exclusively reading may be constituted of the MR film 12 with the coil 6 eliminated. Also in this case, the linearity in sensitivity in sensing can be obtained owing to the invention. Since wear-resistant insulating layers 8 and 18 are provided around the main pole, the wear of the surface contact sliding over the magnetic recording medium can be reduced and thereby long life and improvement in the recording and reproducing characteristics of the magnetic head can be achieved.

Since the end face 2B of the return portion 2 is lower in hardness than the wear-resistant insulating layers 8 and 18, the end face may be recessed for example to a depth of about 10 μm or so by grinding so that the return portion 2 may not come into contact with the magnetic recording medium.

Figure 7:
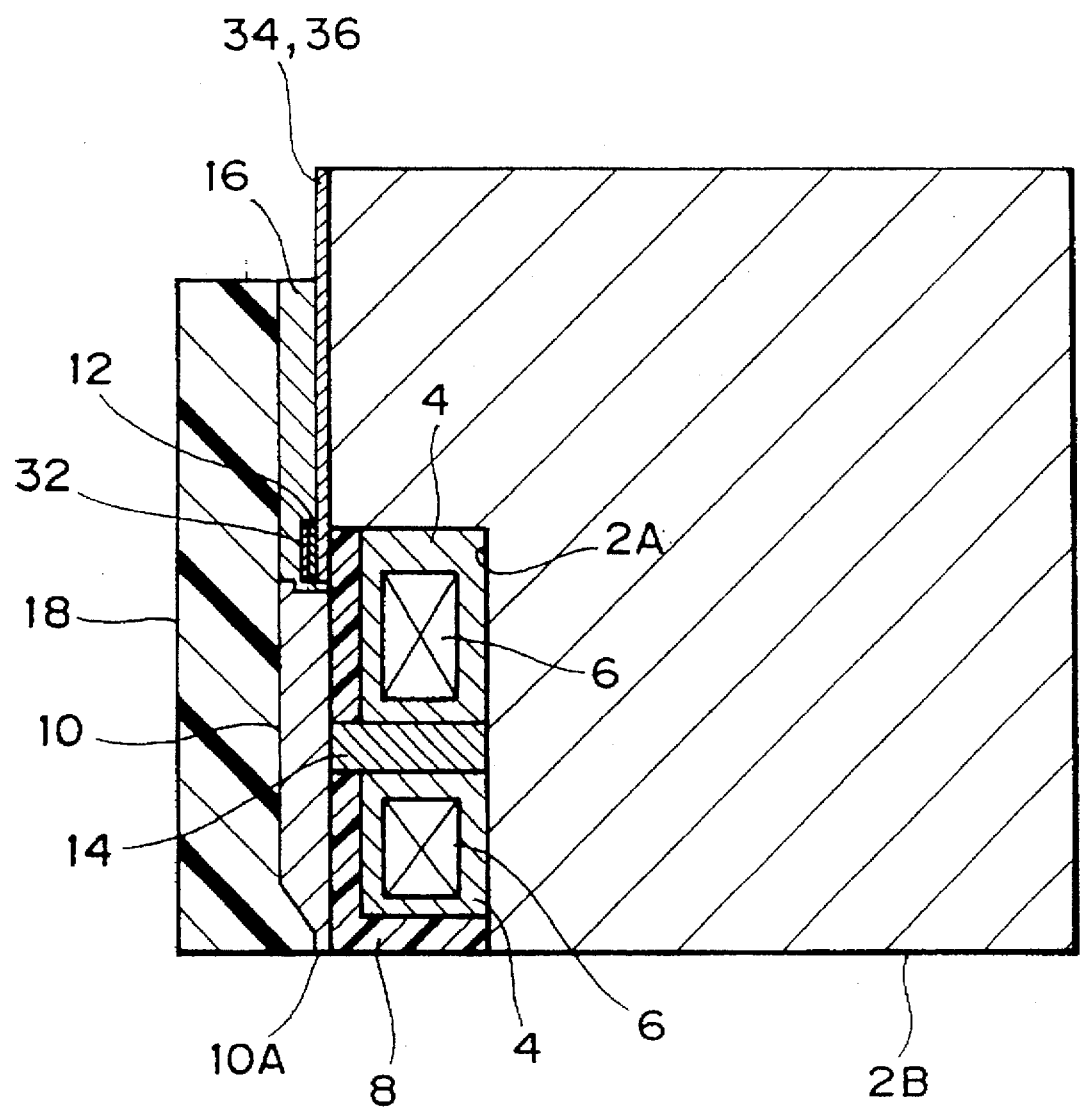
FIG. 7 is a sectional view of a magnetic head indicating a first embodiment of the invention.
Figure 8:
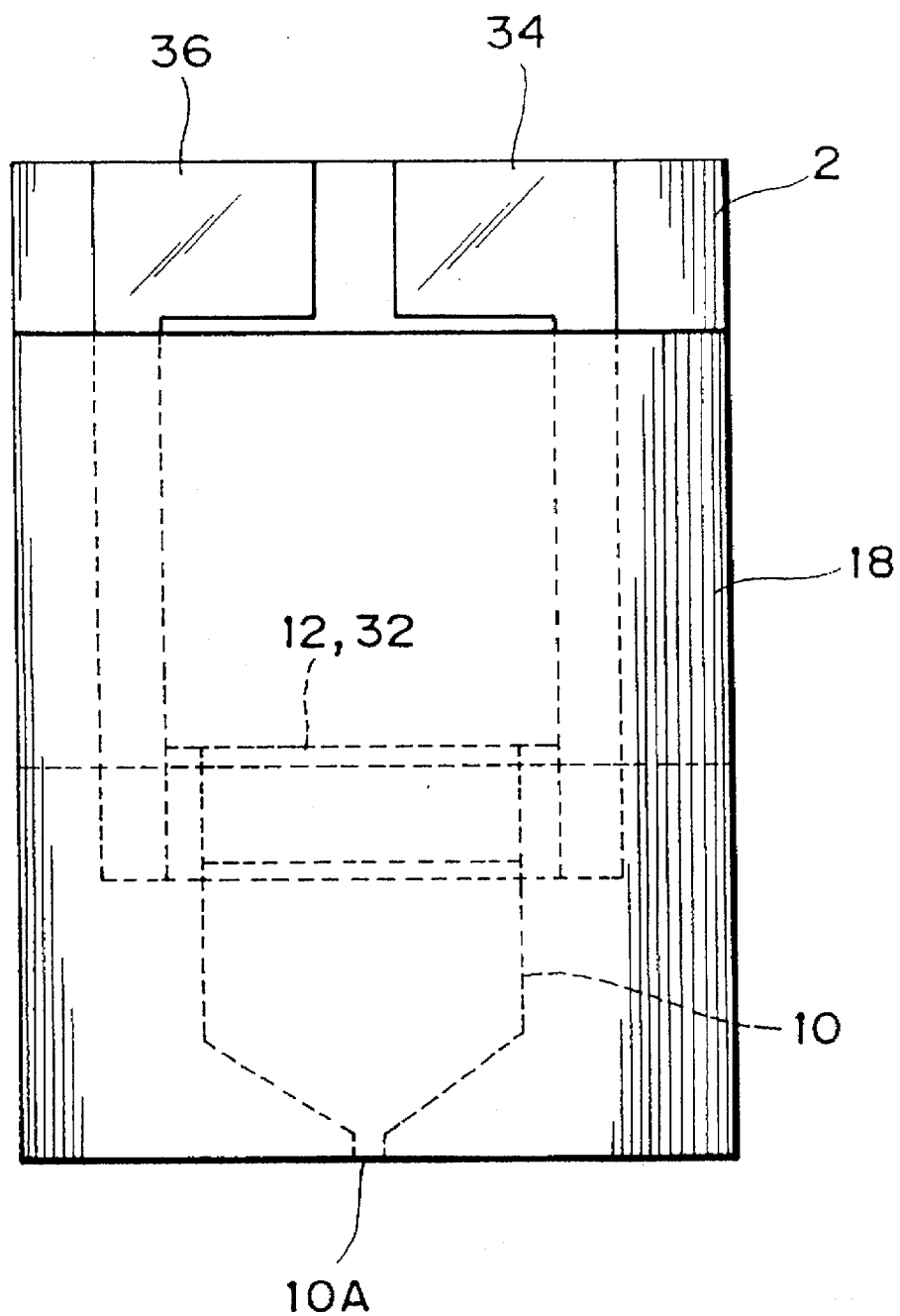
FIG. 8 is a front view of the magnetic head of FIG. 7.

Some of more particular embodiments of the invention will be described below. FIG. 7 is a sectional view of a magnetic head indicating a first embodiment of the invention, and FIG. 8 is a front view of the magnetic head shown in FIG. 7. The magnetic head in the embodiment is characterized by that it further comprises a soft magnetic film 32 of permalloy or the like laminated on the MR film 12. In FIG. 7 and FIG. 8, electrodes 34 and 36 that were not shown in the fundamental structure of FIG. 1 are expressly shown. The electrodes 34 and 36 are electrically connected to both ends of the MR film The direction of initial magnetization of the MR film is virtually orthogonal to the direction of the flux in the magnetic circuit including the MR film 12, main pole 10, magnetic recording medium, and the return portion 2. Namely, the direction of the initial magnetization of the MR film 12 is perpendicular to the surface of paper in FIG. 7.

The characteristics (thickness, permeability, etc.) of the soft magnetic film 32 are set so that the direction of the magnetization of the MR film 12 inclines about 45 degrees with respect to the direction of the initial magnetization when a current for record reading is passed between the terminals 34 and 36. By laminating such a soft magnetic film 32 on the MR film 12, the change in resistance of the MR film 12 against a unit change of the magnetization of the MR film 12 can be maximized and, further, the relationship between the change in resistance and the change in magnetization of the MR film 12 can be virtually linearized.

Figure 9:
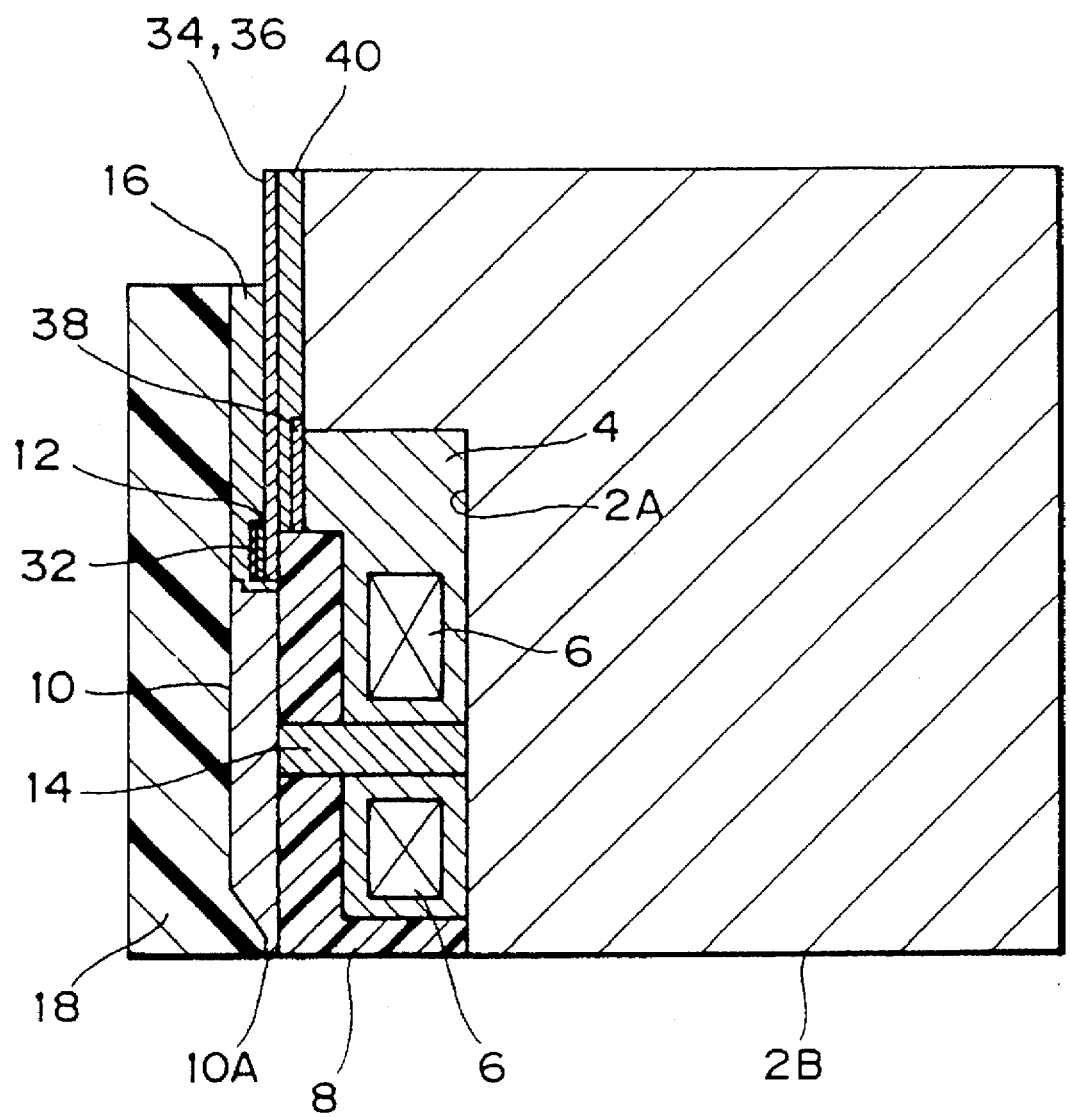
FIG. 9 is a sectional view of a magnetic head indicating a second embodiment of the invention.
Figure 10:
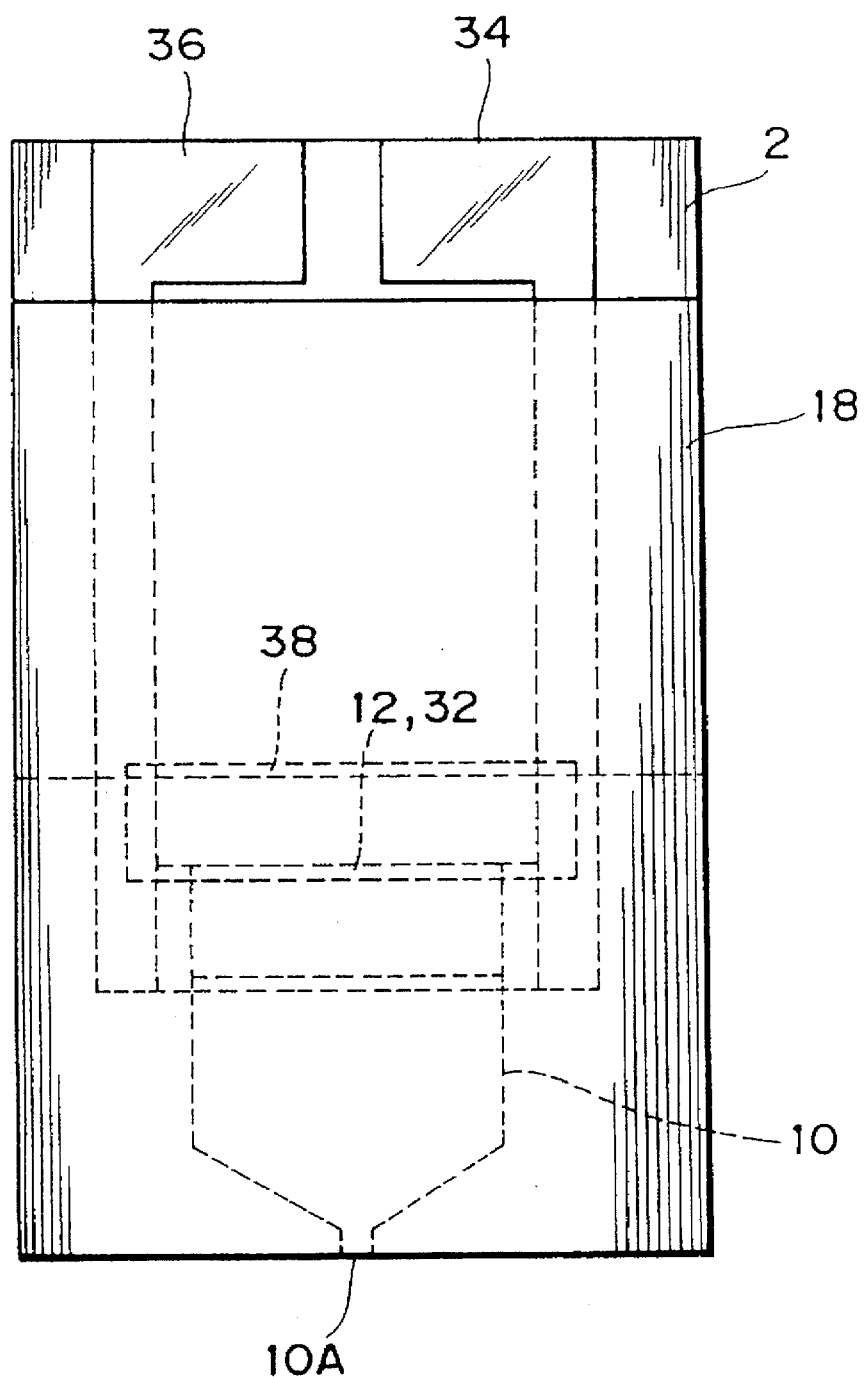
FIG. 10 is a front view of the magnetic head of FIG. 9.

FIG. 9 is a sectional view of a magnetic head indicating a second embodiment of the invention and FIG. 10 is a front view of the magnetic head shown in FIG. 9. Compared with the magnetic head shown in FIG. 7 and FIG. 8, the magnetic head of the present embodiment is characterized in that the top end of the MR film 12 is not magnetically coupled with the return portion 2 directly but the top end of the MR film 12 is magnetically coupled with the return portion 2 through a flux guide 38. The flux guide 38 is disposed on the nonmagnetic insulating layer 8 filled in a recess 2A formed in the return portion 2 and the flux guide 38 are electrically insulated from the electrodes 34 and 36 by a nonmagnetic insulating layer 40 interposed therebetween. According to this structure, the degree of freedom in determining the parameters satisfying the conditions given by the above described expression (2) or (3) can be increased and hence the conditions can be satisfied more easily.

Figure 11:
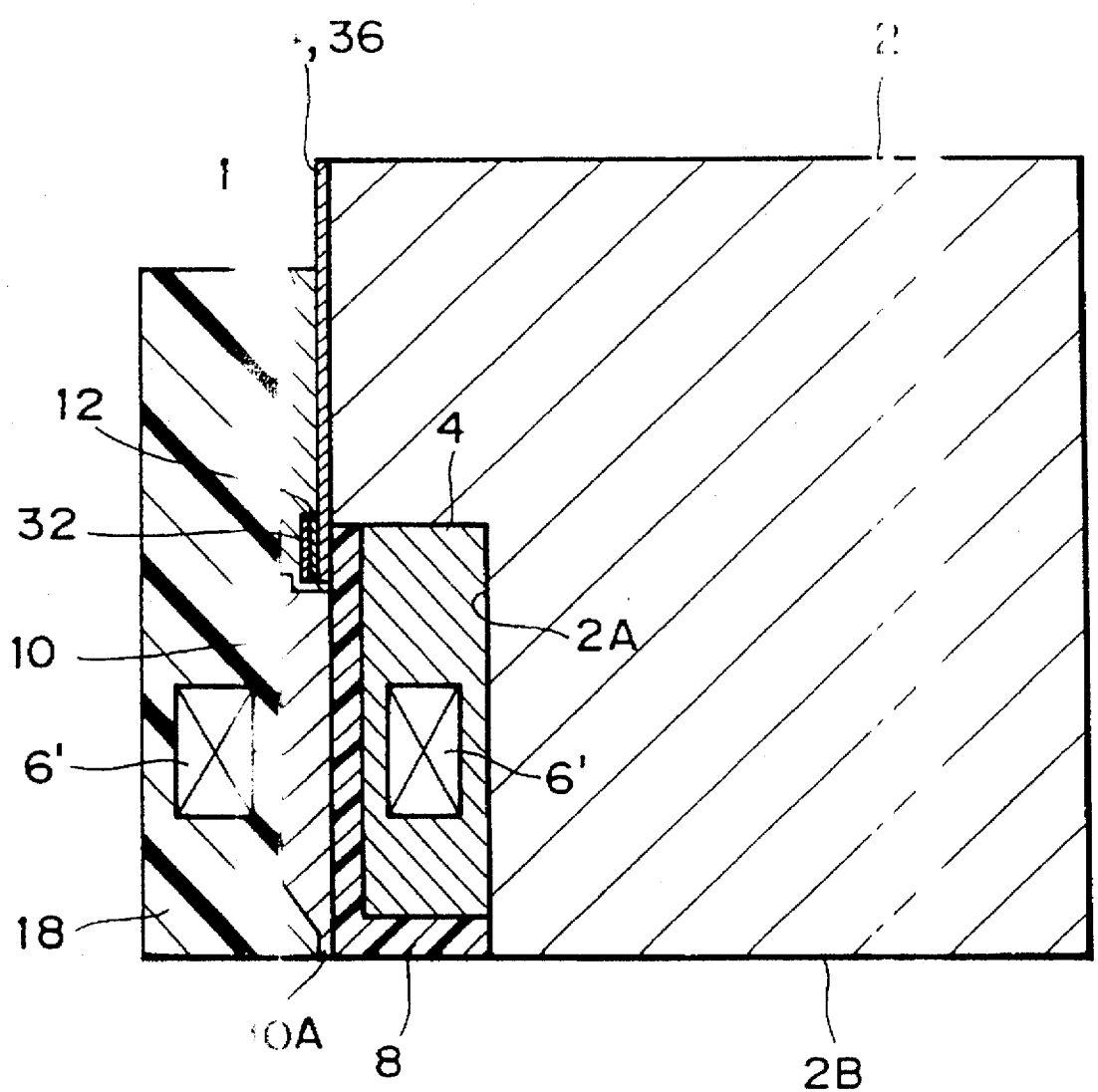
FIG. 11 is a sectional view of a magnetic head indicating a third embodiment of the invention.
Figure 12:
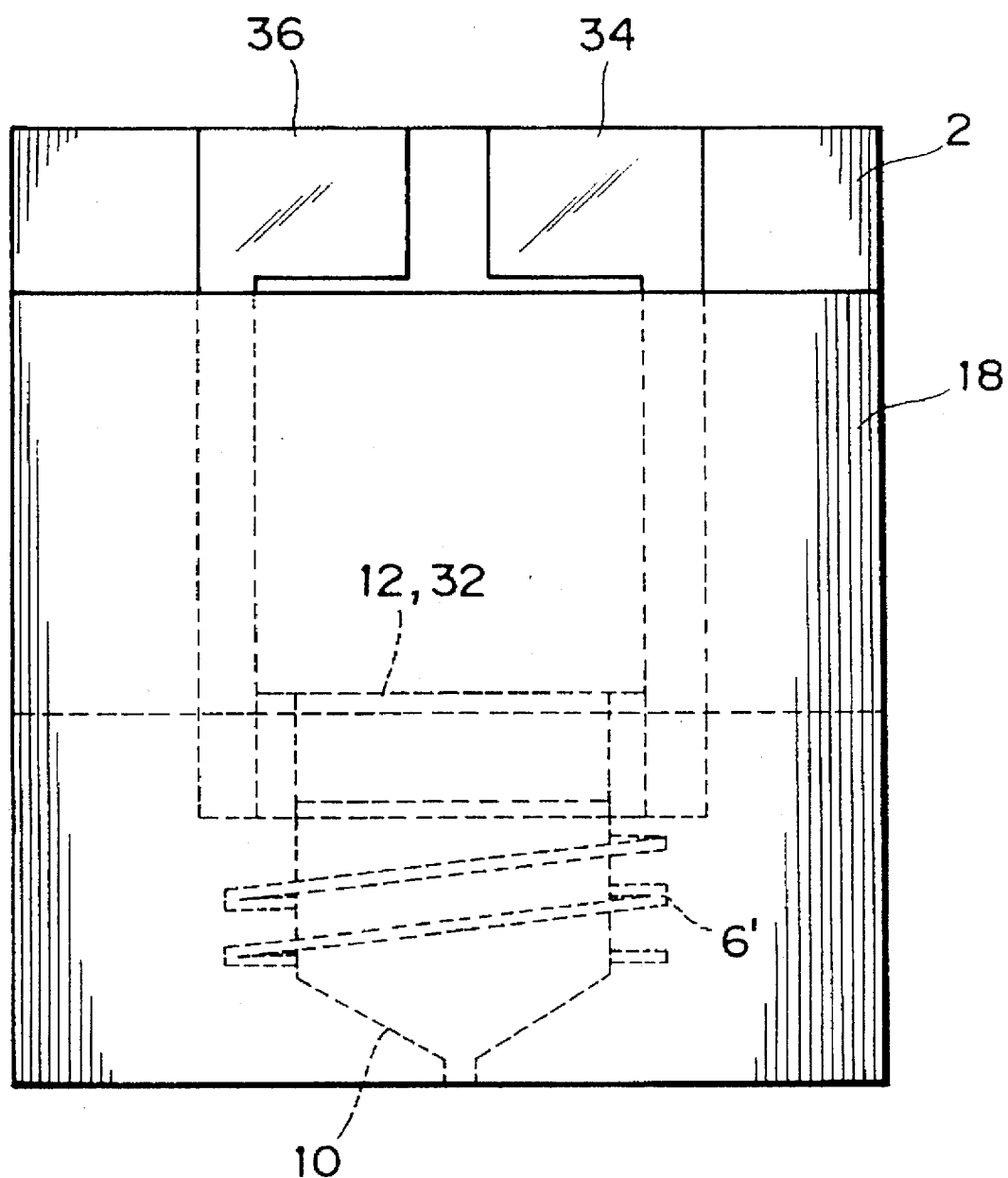
FIG. 12 is a front view of the magnetic head of FIG. 11.

FIG. 11 is a sectional view of a magnetic head indicating a third embodiment of the invention and FIG. 12 is a front view of the magnetic head of FIG. 11. Compared with the embodiments described in the foregoing, the magnetic head of the present embodiment is characterized in that it has no bypass magnetic path and has a coil 6' interlinked with the main pole 10. The coil 6' is spirally formed around the main pole 10 by using an ordinary pattern forming technique.

When there is no bypass magnetic path as in this case, it is preferred to consider a plan against leakage flux from the main pole 10 to the return portion 2. In concrete terms, by setting the dimensions of the members to satisfy $$Rb/Rmr = 0.3 \cdot Smr/Sg,$$

where Rb is reluctance to the leakage flux from the main pole 10 to the return portion 2, Rmr is reluctance of the MR film 12, Smr is the sectional area of the MR film 12, and Sg is the sectional area of the front end portion 10A of the main pole 10, the linearity in sensitivity in sensing can be secured on the principle similar to the principle described in the case of the magnetic head having the bypass magnetic path.

Also in the embodiment, some variations can be made the same as in the previously described embodiments. For example, the coil 6' may be eliminated and the magnetic head may be used as a magnetic head exclusively for reading.

According to the invention, as described above, a merit can be obtained that a magnetic head for vertical magnetic recording in which linearity in sensitivity in sensing is easily secured can be provided. Further, according to the invention, a magnetic head for vertical magnetic recording in a simple structure can be provided in spite of the laminated structure of the recording portion and reading portion.

While preferred embodiments have been described, such description is for illustrative purpose only, and not for restrictive purpose. The scope of the invention is defined by the appended claims and all changes and modifications as fall within the equivalence of the scope of the claims are therefore to be embraced by the invention.

What is claimed is:

1. A magnetic head for vertical magnetic recording comprising:

a return portion having an end face confronting a magnetic recording medium;

a main pole having a front end portion thereof confronting said magnetic recording medium, said front end portion having a sectional area smaller than an area of said end face of said return portion;

a magneto-resistive film provided in a middle of a magnetic circuit including said return portion, said main pole, and said magnetic recording medium, said magneto-resistive film having a first direction of magnetization thereof set in a direction virtually orthogonal to a direction of flux in said magnetic circuit;

a first and a second terminal connected to both ends of said magneto-resistive film; and a bypass magnetic path between said main pole and said return portion bypassing said magneto-resistive film, wherein the relationship given by the expression $$Rb/Rmr = 0.3 \cdot Smr \cdot Bsmr/Sg \cdot Bsg$$

is satisfied, where Rb and Rmr are the magnetic reluctance of said bypass magnetic path and said magneto-resistive film in said magnetic circuit, respectively, Smr and Bsmr are the sectional area and saturated flux density of said magneto-resistive film, respectively, and Sg and Bsg are the sectional area and saturated flux density of the front end portion of said main pole, respectively.

2. A magnetic head for vertical magnetic recording according to claim 1, wherein said magneto-resistive film is disposed between an end portion opposite to said front end portion of said main pole and said return portion in a state electrically insulated from said main pole, and said bypass magnetic path magnetically connects a portion virtually in the center of said main pole with said return portion.

3. A magnetic head for vertical magnetic recording according to claim 1, further comprising a soft magnetic film piled on said magneto-resistive film, wherein said soft magnetic film is provided with a characteristic to incline the direction of magnetization of said magneto-resistive film about 45 degrees with respect to the first direction of magnetization when current for reading is passed between said first and second terminals.

4. A magnetic head for vertical magnetic recording according to claim 1, wherein said main pole and said magneto-resistive film are made of the same material, and the relationship given by the expression $$Rb/Rmr = 0.3 \cdot Smr/Sg$$

is satisfied, where Rb and Rmr are the magnetic reluctance of said bypass magnetic path and said magneto-resistive film in said magnetic circuit, respectively, Smr is the sectional area of said magneto-resistive film, and Sg is the sectional area of the front end portion of said main pole.

5. A magnetic head for vertical magnetic recording according to claim 1, further comprising means for bringing the front end portion of said main pole and the end face of said return portion substantially into contact with said magnetic recording medium.

6. A magnetic head for vertical magnetic recording according to claim 1, further comprising excitation means for exciting said magnetic circuit in accordance with a record writing signal to produce vertical magnetization in said magnetic recording medium.

7. A magnetic head for vertical magnetic recording according to claim 6, wherein said excitation means includes a coil interlinked with said bypass magnetic path.

8. A magnetic head for vertical magnetic recording according to claim 7, wherein said coil also serves for reading and the coil outputs a first read signal, while said magneto-resistive film outputs a second read signal from said first and second terminals.

9. A magnetic head for vertical magnetic recording according to claim 8, further comprising:

means for receiving said second read signal and outputting a differential signal of the second read signal; and means for receiving said differential signal and said first read signal to add the first read signal and the differential signal and outputting an added signal.

10. A magnetic head for vertical magnetic recording according to claim 1, further comprising a wear-resistant insulating film disposed around said main pole.

11. A magnetic head for vertical magnetic recording according to claim 10, wherein said wear-resistant insulating film is made of amorphous carbon.

12. A magnetic head for vertical magnetic recording comprising:

a return portion having an end face confronting a magnetic recording medium;

a main pole having a front end portion thereof confronting said magnetic recording medium, said front end portion having a sectional area smaller than an area of said end face of said return portion;

a magneto-resistive film provided in a middle of a magnetic circuit including said return portion, said main pole, and said magnetic recording medium, said magneto-resistive film having a first direction of magnetization thereof set in a direction virtually orthogonal to a direction of flux in said magnetic circuit; and a first and a second terminal connected to both ends of said magneto-resistive film, wherein the relationship given by the expression $$Rb/Rmr=0.3 \cdot Smr/Sg,$$

is satisfied, where Rb is the magnetic reluctance corresponding to leakage flux between said main pole and said return portion bypassing said magneto-resistive film, Rmr is the magnetic reluctance of said magneto-resistive film in said magnetic circuit, Smr is the sectional area of said magneto-resistive film, and Sg is the sectional area of the front end portion of said main pole, wherein when the front end portion of the main pole is magnetically saturated by the flux in the magnetic circuit, the magneto-resistive film will also be magnetically saturated thereby.

13. A magnetic head for vertical magnetic recording according to claim 12, further comprising means for bringing the front end portion of said main pole and the end face of said return portion substantially into contact with said magnetic recording medium.

14. A magnetic head for vertical magnetic recording according to claim 12, wherein said magneto-resistive film is disposed between the end portion opposite to said front end portion of said main pole and said return portion in a state electrically insulated from said main pole.

15. A magnetic head for vertical magnetic recording according to claim 12, further comprising a soft magnetic film piled on said magneto-resistive film, wherein said soft magnetic film is provided with a characteristic to incline the direction of magnetization of said magneto-resistive film about 45 degrees with respect to the first direction of magnetization when current for reading is passed between said first and second terminals.

16. A magnetic head for vertical magnetic recording according to claim 12, further comprising excitation means for exciting said magnetic circuit in accordance with a record writing signal to produce vertical magnetization in said magnetic recording medium.

17. A magnetic head for vertical magnetic recording according to claim 16, wherein said excitation means includes a coil interlinked with said main pole.

\* \* \* \* \*